US010442273B2

(12) United States Patent  
Wittkowski et al.

(10) Patent No.: US 10,442,273 B2  
(45) Date of Patent: Oct. 15, 2019

(54) HEATABLE INTERIOR LINING ELEMENT

(71) Applicant: IEE International Electronics & Engineering S.A., Echternach (LU)

(72) Inventors: Thomas Wittkowski, Hermeskeil (DE); Michael Olk, Welschbillig (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 346 days.

(21) Appl. No.: 14/900,137

(22) PCT Filed: Jun. 20, 2014

(86) PCT No.: PCT/EP2014/063054  
§ 371 (c)(1),  
(2) Date: Dec. 18, 2015

(87) PCT Pub. No.: WO2014/202768  
PCT Pub. Date: Dec. 24, 2014

(65) Prior Publication Data  
US 2016/0144690 A1 May 26, 2016

(30) Foreign Application Priority Data  
Jun. 20, 2013 (LU) .................................. 92 228

(51) Int. Cl.  
*H05B 3/36* (2006.01)  
*B60H 1/22* (2006.01)  
(Continued)

(52) U.S. Cl.  
CPC ......... *B60H 1/2225* (2013.01); *B60H 1/2215* (2013.01); *B60H 1/2227* (2019.05);  
(Continued)

(58) Field of Classification Search  
None  
See application file for complete search history.

(56) References Cited

U.S. PATENT DOCUMENTS 4,971,848 A * 11/1990 Ruelle .................. H05B 3/84  
428/38  
5,382,398 A * 1/1995 Draxlmaier, Jr. ...... B60R 13/02  
112/470.27  
(Continued)

FOREIGN PATENT DOCUMENTS

WO        03088715 A2    10/2003  
WO    2012087294 A1     6/2012

OTHER PUBLICATIONS

International Search Report dated Sep. 29, 2014 re: Application No. PCT/EP2014/063054; pp. 1-2; citing: WO 2012/087294 A1, WO 03/088715 A2, US 2005/199610 A1.

*Primary Examiner* — Ibrahime A Abraham  
*Assistant Examiner* — Gyounghyun Bae  
(74) *Attorney, Agent, or Firm* — Reising Ethington P.C.

(57) ABSTRACT

An interior lining element, for example for a passenger compartment of a vehicle, including a single-layer or multilayer decorative covering, the front side of which faces the passenger compartment and delimits the latter physically and, via the back side thereof, is in thermally conductive contact with a printed heater, where the heater has a plurality of flat resistance elements and at least two feed lines which are electrically highly conductive as compared with the resistance elements and via which the resistance elements can be looped into an electric circuit, and where in contact-making regions of the resistance elements and of the feed lines, one feed line and one resistance element are each printed overlapping each other.

24 Claims, 10 Drawing Sheets

(51) Int. Cl.
*B60R 13/02* (2006.01)
*H05B 3/06* (2006.01)
*H05B 3/14* (2006.01)
*H05B 3/26* (2006.01)
*H05B 3/34* (2006.01)
*B60H 1/00* (2006.01)

(52) U.S. Cl.
CPC ............ *B60R 13/02* (2013.01); *H05B 3/06* (2013.01); *H05B 3/145* (2013.01); *H05B 3/267* (2013.01); *H05B 3/342* (2013.01); *H05B 3/36* (2013.01); *B60H 2001/00221* (2013.01); *B60H 2001/2287* (2013.01); *B60H 2001/2293* (2013.01); *B60R 2013/0287* (2013.01); *H05B 2203/002* (2013.01); *H05B 2203/003* (2013.01); *H05B 2203/005* (2013.01); *H05B 2203/007* (2013.01); *H05B 2203/011* (2013.01); *H05B 2203/013* (2013.01); *H05B 2203/02* (2013.01); *H05B 2203/022* (2013.01); *H05B 2203/037* (2013.01); *H05B 2214/04* (2013.01)

(56) References Cited

U.S. PATENT DOCUMENTS

| | | | | |
|---|---|---|---|---|
| 6,392,209 B1 * | 5/2002 | Oppitz | ............... | G03G 15/2053 219/541 |
| 6,703,586 B1 * | 3/2004 | Kast | ................. | B32B 17/10018 219/203 |
| 9,491,806 B2 * | 11/2016 | McCarthy | ................ | H05B 3/84 |
| 2003/0127452 A1 * | 7/2003 | Gerhardinger | ........ | A47F 3/0434 219/497 |
| 2004/0113127 A1 * | 6/2004 | Min | ....................... | H01B 1/128 252/500 |
| 2005/0199610 A1 | 9/2005 | Ptasienski et al. | | |
| 2005/0242607 A1 * | 11/2005 | Neumann | ............... | B60R 13/02 296/39.1 |
| 2006/0292938 A1 * | 12/2006 | Schwenke | ................ | H05B 3/84 439/876 |
| 2007/0013474 A1 * | 1/2007 | Cutuli | ..................... | H01C 1/14 338/195 |
| 2007/0036979 A1 * | 2/2007 | Roding | ................... | B60R 13/02 428/411.1 |
| 2010/0000981 A1 * | 1/2010 | Diemer | ................. | H05B 3/146 219/202 |
| 2010/0038356 A1 * | 2/2010 | Fukuda | .................. | H01C 7/021 219/549 |
| 2010/0038357 A1 * | 2/2010 | Fukuda | .................. | H01C 7/021 219/553 |
| 2010/0176110 A1 * | 7/2010 | Ogino | ................ | B60H 1/00271 219/202 |
| 2011/0147369 A1 * | 6/2011 | Spooner | ..................... | F41J 2/02 219/552 |
| 2012/0217232 A1 * | 8/2012 | Hermann | ............. | B60H 1/2215 219/202 |
| 2012/0255192 A1 | 10/2012 | Schroder et al. | | |
| 2014/0034633 A1 * | 2/2014 | Heintz | ................... | H05B 3/565 219/525 |
| 2014/0042375 A1 | 2/2014 | Kim et al. | | |

* cited by examiner

HEATABLE INTERIOR LINING ELEMENT

TECHNICAL FIELD

The present invention generally relates to an element for lining of an interior space (interior lining element), in particular, but not necessarily, of a passenger compartment. Specifically the invention relates to a heatable interior lining element.

BACKGROUND

Panel heaters in the passenger compartment of vehicles are enjoying growing popularity, as they improve the comfort of the passengers and at the same time use electrical energy economically. Existing panel heating concepts mainly use technologies which were originally developed for seat heaters. Seat heaters to improve passenger comfort are well established on the market today. However, panel heaters have some particularities which distinguish them from seat heaters in essential points.

Panel heaters in serial electric wiring are generally implemented with wire heaters, i.e. Joule heating of an electrically heated wire of a defined resistance per unit length. This concept, which is well known from seat heating, drives heating wires up to a relatively high temperature. For this reason cushioning is required towards the side of the decorative covering, in order to homogenize the temperature range across the whole decorative covering and in order to ensure that the stipulated maximum temperature at the decorative covering is not exceeded. The cushioning is also required in order to make the wires invisible from the side of the decorative covering and in order to make it impossible to touch them haptically. Such an integration concept, which requires an additional cushioning of the panel heater, is clearly opposed to slim integration, fast heating behavior and energy-efficient heating and operation.

BRIEF SUMMARY

Presented herein is an improved interior lining element.

According to an embodiment of the invention, an interior lining element, for instance for the passenger compartment of a vehicle, has a single-layer or multilayer decorative covering, the front side of which faces the passenger compartment and delimits the latter physically, and which via its back side is in thermally conductive contact with a printed heater. The heater comprises a plurality of flat resistance elements and at least two feed lines, which are electrically highly conductive as compared with the resistance elements and via which the resistance elements can be looped into an electric circuit. Preferably in contact-making regions of the resistance elements and the feed lines, at least one feed line and one resistance element respectively are printed overlapping each other.

At least two of the flat resistance elements have different mean sheet resistances. The majority of the flat resistance elements are arranged and wired between two connection points of the heater in such a way:
   that the at least two flat resistance elements are wired one behind the other via the feed lines starting from the connection points, and
   that the mean sheet resistances of the at least two resistance elements reduce or get smaller the further away they are from the connection points of the heater.

According to the invention, several of the flat resistance elements have different mean sheet resistances and are arranged in such a manner that the mean sheet resistances, when moving away from the electricity connection points of the heater, preferably decrease monotonously. Through this arrangement of the resistance elements, a drop in the electricity supply across the individual heating elements can at least partially be compensated for, and hence the power distribution along the heater can be adjusted.

An interior lining element according to this invention may for instance constitute a vehicle door inner lining element, the interior roof lining element of a passenger compartment, a foot well lining element or a dashboard lining element. Of course the interior lining element invented may find other uses.

The flat resistance elements are preferably to be made as polymer thick film prints which as electrically conductive components preferably comprise graphene, carbon nanotubes, carbon black (carbon particles, such as soot), graphite or mixtures of these. For the resistance elements inks are particularly preferred which have a positive temperature coefficient (PTC materials), i.e. the electric resistance of which increases with rising temperature. With the help of such inks, the heating power can automatically be cut back when the temperature rises.

The electrically highly conductive feed lines, however, may comprise for instance a print with a silver-based or copper-based ink. What could be considered are those polymer thick film prints which have as their ink a compound material containing silver flakes (of the μm order of size) a binding agent, a solvent, and further additives. Another possibility is provided by inks made of silver nanoparticles which require no further binders, and during the drying step sinter and hence realize the highest specific conductivities. Another possibility is inks with copper or copper oxide nanoparticles which are chemically reduced in the drying process and also sinter.

As printing processes for the manufacturing of the heater, screen printing processes (e.g. flatbed or rotary printing) are preferably to be used. Other printing processes such as relief printing, gravure or inkjet printing are, however, also possible. In order to dry or sinter the inks, convection ovens with temperatures up to approx. 150° C. are used, but also infrared dryers, UV dryers and flash lamps which are mainly in the visible area of the electromagnetic spectrum.

The resistance elements, individually or in groups, are preferably arranged electrically parallel to each other via the feed lines.

The resistance elements can advantageously form rectangular areas, wherein the contact-making regions extend along opposite sides of the rectangular areas. The formed rectangular areas can be of different sizes and proportions.

At least two of the rectangular areas may have different printing patterns, so that due to the different printing patterns they may have different mean sheet resistances. Such differences in the sheet resistances can be exploited in order to individually adapt the heating power of the individual rectangular areas. In particular the different printing patterns can be selected in such a manner that the heating power is spread out over the entire heater in a homogeneous manner.

At least two of the rectangular areas can form different electric resistances between their respective contact-making regions. Such resistance differences may come about for instance due to different sizes, proportions or printing patterns of the rectangular areas.

According to a preferable embodiment of the invention, the resistance elements are configured such that the heating power per unit area of the individual rectangular areas is in the range of 85% to 115%, preferably in the range of 90% to 110%, even more preferably in the range of 95% to 105% of the mean heating power per unit area of all areas. In this way a relatively homogeneous temperature distribution across the heater is attained. Embodiments are particularly preferable in which there are not overly high temperature differences locally, i.e. within each individual rectangular area. When periodic printing patterns are used, care is therefore preferably to be taken that the two-dimensional elementary cell of the model has an extension in the range of 1/20 to 1/3 of the length of the heater area in a direction in which there are temperature differences due to the pattern. Typically this extension is no more than 30 mm. When non-periodic printing patterns are used, care is preferably to be taken that recesses in pressure in one direction in which, due to the pattern, temperature differences emerge, will generally have an extension of typically no more than 5 mm. Particularly preferable forms of embodiment of the invention are those in which the heating power per unit area, averaged over the whole area which is delimited by a boundary line formed by the outer edges of the rectangular areas and the lines connecting these outer edges, is not less than 65%, preferably no less than 75%, of the average heating power per unit area of all rectangular areas. Should a boundary line surround one or more (continuous) openings in the interior lining element, the area of these openings is to be deducted from the total surface area for the purpose of the calculation of the average heating power per unit area. With this characteristic, a high heating capacity per unit area of the heater is guaranteed. In various arrangements the overall area may be in accordance with the convex envelope of the rectangular areas. However, this is not necessarily the case.

According to a preferable embodiment of the invention, at least two resistance elements are electrically arranged in series via a connecting line which is highly electrically conductive compared with the resistance elements. This kind of arrangement may prove to be advantageous, e.g. in order to implement an unheated recess. Such recesses may be planned for example in order to allow an opening to be made in the interior lining element, or in order to leave an area with high spatial curvature (i.e. with small radii of curvature). The at least two resistance elements electrically arranged in series are preferably to be electrically arranged in parallel, via the feed lines, with at least one other resistance element or at least two further resistance elements electrically arranged in series.

In the manufacture of the interior lining element, the imprinting of the printing substrate with the resistance elements is preferably to be carried out in one single printing step. A particularly advantageous embodiment of the invention is therefore one in which the resistance elements comprise the same printing material (i.e. the same ink). It is similarly advantageous if the printing material has the same thickness for all resistance elements, as under these conditions it is possible to use a particularly economical printing procedure.

The interior lining element can advantageously comprise a shaping support in the form of a support panel, sprayed foam part or injection-molded part, on which the decorative covering is laminated with or without a cushioning interim layer, or which is molded by back-injection to the decorative covering, with or without a cushioning interim layer. The shaping support may be flat or spatially curved. The term "support panel" here means a board which gives the interior lining element form and stability. Potential materials for the support panel are for instance epoxy resin grouted with natural or artificial fibers, a thermoplastic on the basis of polyolefin and sawdust, glass fiber reinforced polypropylene composite, glass fiber reinforced polyurethane foam, etc. For the lamination of the decorative covering thermally activatable two-component adhesives are preferably used. Other adhesives (reactive or non-reactive) are possible. During lamination the support panel is laid into the heated bottom part of a pressing device; the decorative material is laid over the support panel and it is subsequently laminated using the upper part of the press, crease-free and with moderate pressure, onto the support. When molding an injection-molded part by back-injection to the decorative covering, an In-Mold process can be used. The decorative covering is laid on an injection mold. Subsequently the back side of the injection mold is closed, and in the injection molding process the decorative covering is molded by back-injection and pressed crease-free onto the front side of the mold. After the cooling/solidifying of the back-injected molding the decorative covering retains its form. In this case, the back-injected molding plays the role of the shaping support.

Embodiments are particularly preferable in which the heater is directly printed on the back side of the decorative covering (i.e. immediately, without a separate printing substrate). Alternatively, the heater could be printed directly on the cushioning layer which is fastened to the back side of the decorative covering. When a support panel is used, under certain circumstances the possibility may be considered for the heater to be printed directly on the support panel. These possibilities have in common that the heater is printed directly on a component (decorative covering, cushioning layer or shaping support) of the interior lining element without the use of a separate printing substrate which would have to be incorporated in the composite layers of the interior lining element after printing.

The shaping support may have a spatial curvature and the decorative covering, taking on this curvature, is fixed on the support. In this case it is to be seen as advantageous if the resistance elements are areas of the decorative covering with curvature radii smaller than 1 cm, printed as recesses.

The decorative covering may have a lateral overhang relative to the shaping support which envelopes one edge of the support and is also stuck to the support. The feed lines may extend to the enveloping lateral overhang and form electrical connections there. In this way it is possible for the heater to be connected to an electricity supply on the back side of the support. So that during the enveloping of the edge there is no damage to the feed lines through excessive mechanical stresses, it may be planned for the edge of the support, at least where the feed lines extend to the enveloping lateral overhang, to have a curvature radius of not less than 0.5 mm. In order to further simplify connection, the overhang may have a prolongation to which the feed lines extend, and in which they form the electrical connections. Here the prolongation is not stuck to the support, in order to maintain access to the electrical connections. In the area in which they extend to the enveloped overhang, the feed lines (compared with other areas of the heater) may be printed thicker and/or wider, in order to compensate for any changes in resistance through stretching or compression which has occurred in the edge of the enveloping area.

The heater may also have three or more feed lines via which the resistance elements, individually or in groups, can be looped into different electric circuits for their electricity supply. Individual resistance elements or groups of such elements can be controlled separately in this kind of embodiment. If in this kind of embodiment the feed lines for contact-making are led around the edge of a shaping support, this preferably takes place in (at least two) different places.

BRIEF DESCRIPTION OF THE FIGURES

Further details and advantages of the invention will become apparent from the following detailed description of possible embodiment forms of the invention in the figures below. These show.

Figure 1:
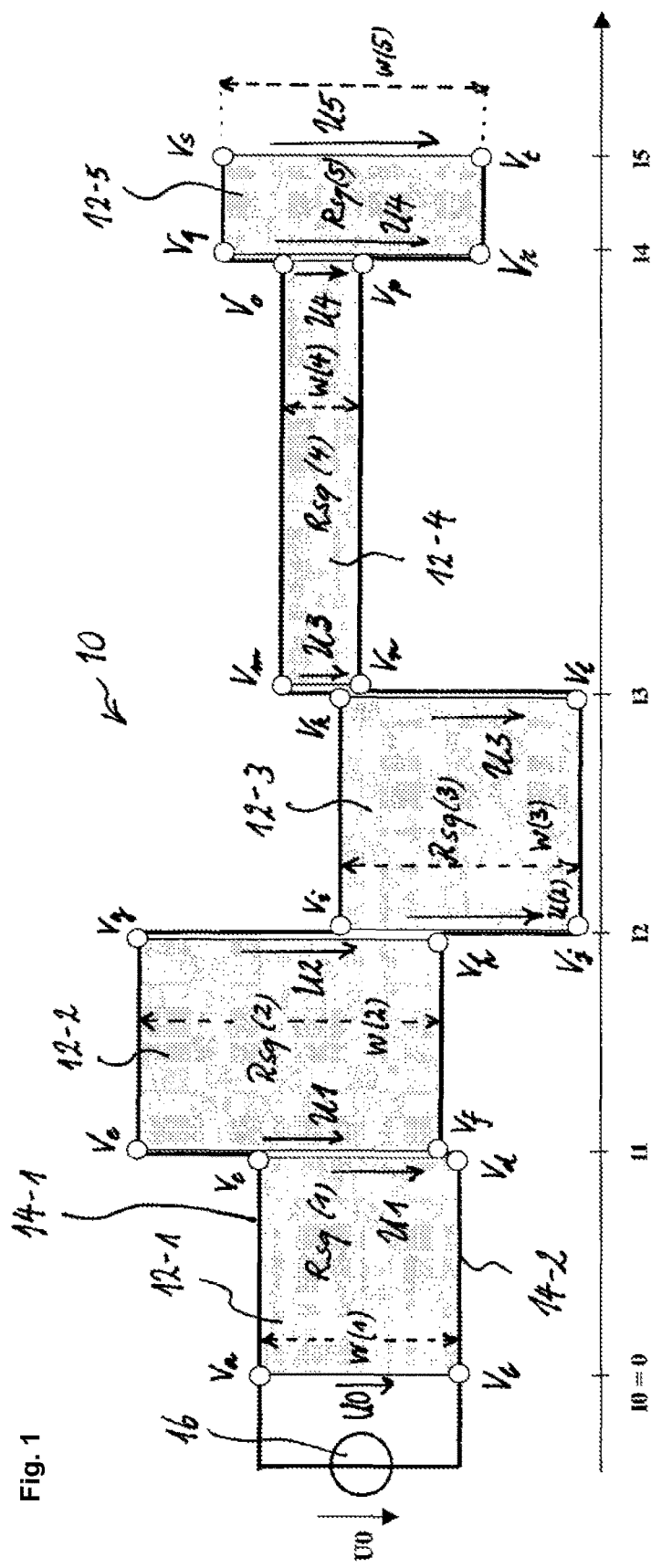
FIG. 1 a schematic plan view of a printed heater with five different resistance elements.

In the diagrams the measurements given are to be understood as examples.

DETAILED DESCRIPTION

With reference to FIGS. 1 to 17, interior lining elements are described which comprise a heater which is directly printed on the back side of a decorative material, a cushioning layer or a support panel and which is operated as an electric parallel circuit. Among other things, the processes are described with which the layer resistances required are investigated under given boundary conditions and can be realized in the printing process. The construction of the interior lining element is also described, as well as processes of industrial manufacture thereof.

The printed heater 10 shown in FIG. 1 comprises five different rectangular resistance elements 12-1, 12-2, 12-3, 12-4, 12-5 (also referred to in the following as "heating elements"), which lie parallel to each other in the heating circuit, and which for the purpose of heating are electrically connected via feed lines 14-1, 14-2 with an electricity source 16. The feed lines 14-1, 14-2 have a finite electric resistance. The geometrical dimensions of the individual heating elements 12-1, 12-2, 12-3, 12-4, 12-5 and the electric resistances in realistic applications are such that the supply voltage in each heating element can drop noticeably, which would lead to an unequal distribution of power if no measures were taken against this. In the case of the layout of FIG. 1, the total area mentioned above extends between the abscissae l0 and l5 and in this area is essentially limited by feed lines 14-1 and 14-2.

In the following it is shown how the layout of the resistance prints can be arranged in order to a) attain the highest possible homogeneity of power and hence of temperature (in this way automatically the highest surface power density is attained for a given maximum temperature TmaxS) and hence b) realize a simple construction of the interior lining element by means of industrial processes.

Through the layout of heating elements described herein, it is made possible among other things to omit from the printing (and heating) areas of strong spatial curvature or areas which are designed for other functional elements such as door openers.

Layout of the Sheet Resistances of the Heater

Let us assume a geometrical design of the printed heater which is composed of rectangles of different sizes. FIG. 1 shows the schematic structure of this kind of heater 10. In practice the problem often emerges that a given three-dimensionally shaped lining area with a heater needs to be printed. The panel area typically has a complex form, but certain areas in particular, for instance areas with strong curvature, should not be heatable. In FIG. 1 it is shown that each area may be of different sizes (different length and width), that the sheet resistances of each rectangular heating area may be different and that the areas do not need to be ordered one after the other on an axis of symmetry.

In the following concrete specifications are described on the choice of sheet resistances with given geometry, on-board voltage, feed line resistance and target value for the surface power density of the heater. The description refers to a number N (at least 2) of rectangular heating areas. First the number N=5 is chosen as an illustration.

In FIG. 1 the sheet resistances are described as Rsq(i), i=1, 2, 3, 4, 5. The $i^{th}$ resistance element begins at the position l(i−1), such that the first element begins in position l0=0 and the fifth element ends at position l5. The width of the elements is referred to as w(i), i=1, 2, 3, 4, 5. The feed lines (which are in bold in FIG. 1) have the same resistance per unit length everywhere, R/l. The following holds: R<Rsq (i). The electric potentials are referred to as Va up to Vt. The feed lines touch the resistance elements 12-1, 12-2, . . . , 12-5 only along their longitudinal sides (axis of l0, l1, . . . , l5). The sides of the resistance elements which extend in the other direction 12-1, 12-2, . . . , 12-5 are spaced by the feed lines, which to some extent is not clearly recognizable in FIG. 1, and is therefore mentioned here explicitly. The potential differences correspond to the following voltages: U(i), i=0, 1, 2, 3, 4, 5:

Va=Vb=U0=on-board voltage
Vc=Vd=Ve=Vf=U1
Vg=Vh=Vi=Vj=U2
Vk=Vl=Vm=Vn=U3
Vo=Vp=Vq=Vr=U4
Vs=Vt=U5

Moreover, the following is defined:

$$rp := \frac{2R}{l} \quad \text{(Eq. 1)}$$

$$gp(i) := \frac{1}{Rsq(i) \cdot w(i)} \quad \text{(Eq. 2)}$$

The surface power densities of the heater are discontinuous at the l(i) positions. In the immediate environment of positions l(i), the following applies for the surface power densities P(i)/A:

$$\frac{P(i, 1)}{A} = \frac{U(i)^2}{Rsq(i) \cdot w(i)^2} \quad \text{for } \; < l(i), \text{ and}$$

$$\frac{P(i, 2)}{A} = \frac{U(i)^2}{Rsq(i+1) \cdot w(i+1)^2} \quad \text{for } \; > l(i) \quad \text{(Eq. 3)}$$

The target value of the surface power density is referred to as Psoll/A.

The Rsq(i) are now selected such that the deviations of the P(i)/A from the target value of the surface power density, Psoll/A, are made minimal. For this purpose a target function is chosen which normally needs to be minimized numerically. A possible target function F is:

$$F := \sum_{i=0}^{N} \sum_{j=1}^{2} \left( \frac{Psoli}{A} - \frac{P(i, j)}{A} \right)^2 \quad \text{(Eq. 4)}$$

The minimizing of the target function F shows how the sheet resistances Rsq(i), i=1, ..., N, are to be selected such that the surface power density of the heating elements is as close as possible to the target value for the surface power density. Knowledge of the voltages U(i), i=0, ..., N, is necessary for the calculation of F or P(i,j)/A. These voltages can be given as a function of the known dimensions: a.) Wire resistance per unit length rp, b.) geometry with parameters l(i) and w(i), c.) the on-board voltage U0 and d.) the unknown sheet resistances Rsq(i) or gp(i). The values of these voltages depend on the number of rectangular heating areas in the heater.

Implementation of Different Sheet Resistances

As shown above, due to different parameters (geometry, voltage curve in the feed lines, etc.) it may be necessary to select different sheet resistances in the different rectangular heating elements in order to attain a sufficiently homogeneous temperature distribution for the heater as a whole. For this different procedures are possible.

For example, the different rectangular heating areas may be produced with different printing thicknesses, in such a way that the required sheet resistance is set exactly. For this, however, it is necessary to choose different printing parameters for each rectangular heating area, which requires a high degree of effort. Another procedure comprises in using different resistor inks for the individual heating areas, with different specific electric resistances. With skilled selection of ink types, the sheet resistance required can be set for any rectangular heating area. It is also conceivable that an ink system is used which at least comprises a low-conductivity and a high-conductivity component. Through the blending of the at least two components, the specific resistance of the mixture can be set in such a way that the required sheet resistance Rsq(i) is attained. The procedures mentioned have the disadvantage that the individual rectangular heating areas have to be printed with different parameters or inks. Even if other solutions are theoretically conceivable, in practice this requirement can only by attained through several consecutive printing steps.

In the present invention, the sheet resistance is preferably adjusted through the structuring of the printed area. This procedure is described in the following as printing pattern adaptation. In order to attain different sheet resistances for different rectangular heating areas, with the procedure of printing pattern adaptation only a single printing step is required. As long as the size of a single printed structure element in the printing pattern is significantly smaller than the dimensions of the rectangular heating area, the surface power density of the rectangular heating area as a whole appears to be homogeneous. Additionally, the area which is actually imprinted through the adapted printing pattern must be in a favorable ratio to the entire area of a rectangular heating element: typically more than half of the area should actually be imprinted. In this way an effective sheet resistance, $Rsq_{eff}$, emerges for the printed area structured in this way, which depending on the choice of the printing pattern is greater than with printing of the whole area. In this way the effective sheet resistance can be precisely adjusted to the value required.

The areas structured through printing pattern adaptation are characterized by the ratio of the effective sheet resistance $Rsq_{eff}$ to the sheet resistance in the case of printing of the whole area, Rsq. This resistance factor is called a scaling factor, $f_s$.

$$f_s = \frac{Rsq_{eff}}{Rsq} \quad \text{(Eq. 5)}$$

In the following four different procedures (I to IV) of printing pattern adaptation are disclosed. If the requirements above are observed (more than half of the area imprinted, structure size significantly smaller than the size of the heating element), for each of the printing pattern adaptation procedures described in the following a characteristic range emerges in which the scaling factor $f_s$ can be sensibly selected and set.

Figure 2:
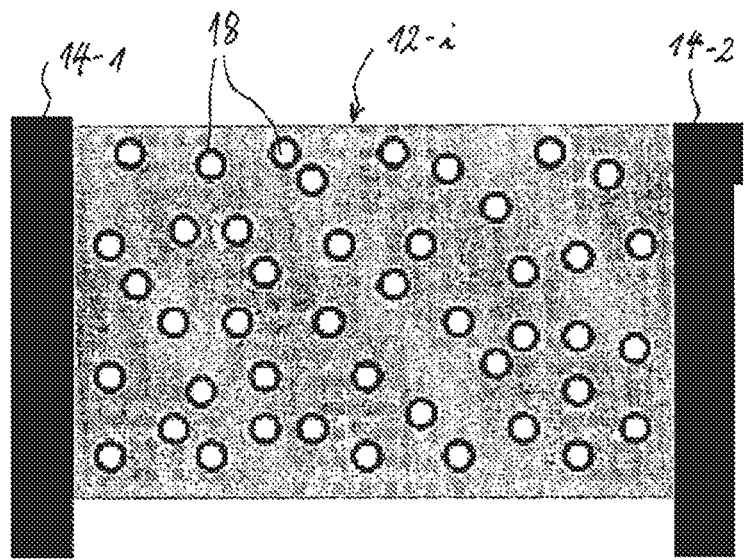
FIG. 2 a schematic plan view of a rectangular heating area with recesses according to a first procedure for adapting the printing patterns.
Figure 3:
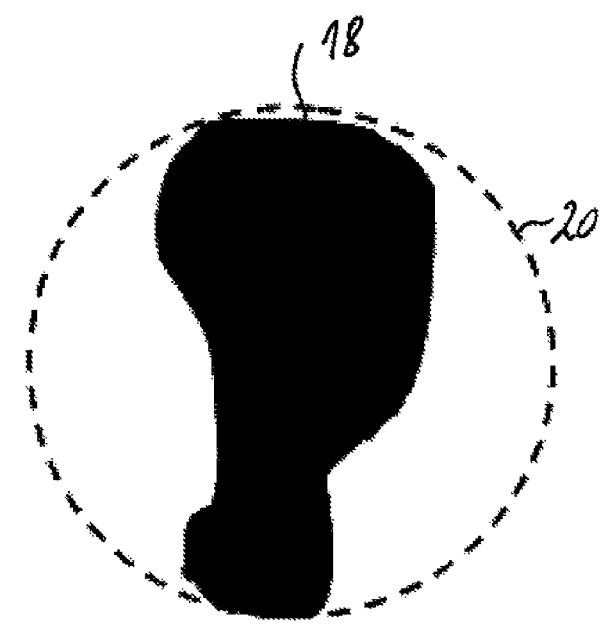
FIG. 3 an illustration of one possible shape of a recess (black) according to the first procedure of printing pattern adaptation.

In the first procedure (Procedure I) to vary the effective surface area, the printed area is structured with recesses which are much smaller than the dimensions of the rectangular heating element (FIG. 2). The precise locations of the recesses 18 on the heating area 12-i can be selected in different ways—typically a random arrangement is to be preferred over a regular one. It is only necessary for the recesses 18 to be compact. This is the case if, as illustrated in FIG. 3, the area of recess 18 is at least a third of the area of the enveloping circle 20 of the respective recess 18. Typically the linear dimensions of the recesses should be in the range of between a thousandth and a twentieth of the dimensions of the heating area. The shape of the recesses is not of key importance. Possible shapes are ellipses, rectangle, diamonds, or in general any shape of any size. In particular, different shapes and sizes of recesses can appear in a printing pattern adaptation.

The scaling factor $f_s$ for the boundary conditions described in this procedure is given using the ratio of the total area $A_{total}$ to the printed area $A_{printed}$ (Eq. 6).

$$f_s \approx \frac{A_{total}}{A_{printed}} \quad \text{(Eq. 6)}$$

Since the printed area encompasses more than half of the available area, for this procedure a range emerges for the scaling factor: $1 < f_s < 2$.

Figure 4:
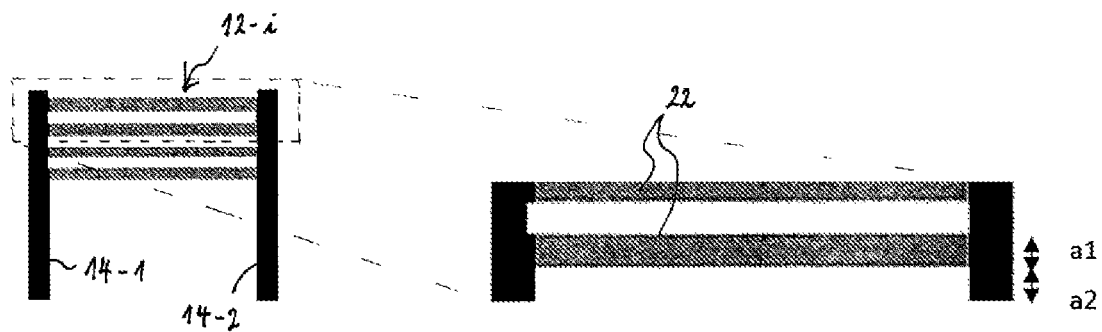
FIG. 4 a schematic plan view of a rectangular heating area according to a second procedure of printing pattern adaptation, as well as detail thereof.

A second procedure (Procedure II) is based on structuring the area by dividing it into individual strips 22 (FIG. 4). In order to attain homogeneous power distribution, the strip width a1 is chosen much smaller than the length l of the respective area heating element 2-$i$.

The scaling factor $f_s$ is calculated according to Eq. 7.

$$f_s \approx \frac{a2 + a1}{a1} \quad \text{(Eq. 7)}$$

An accessible and permitted range also emerges from this procedure for the scaling factor: $1 < f_s < 2$.

The printing pattern adaptations, in accordance with the two procedures disclosed, I and II, are very simple to produce, but have the disadvantage that they have a relatively small scaling range ($1 < fs < 2$). The effective resistance can, under the boundary conditions required, at a maximum only be twice as large as the sheet resistance in the event of the full area being printed.

Figure 5:
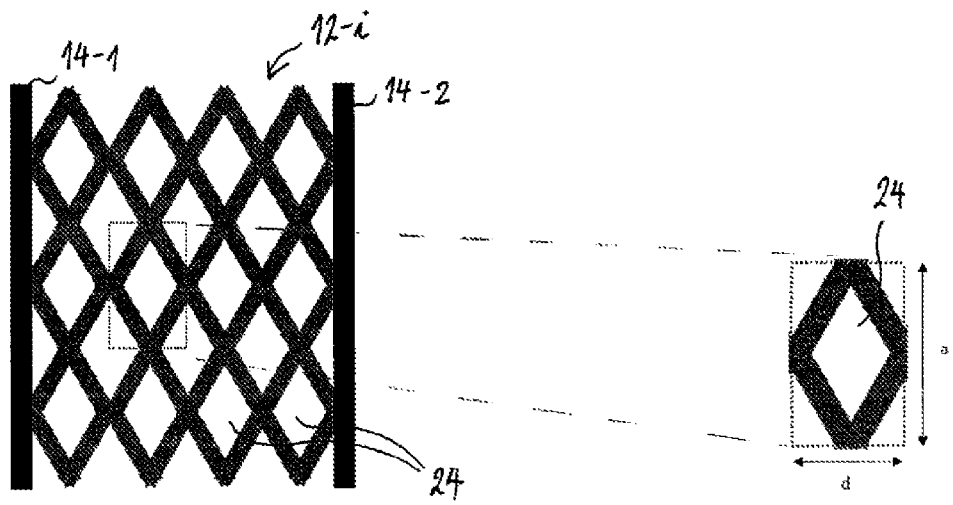
FIG. 5 a schematic plan view of a rectangular heating area according to a third procedure of printing pattern adaptation, as well as detail thereof.
Figure 6:
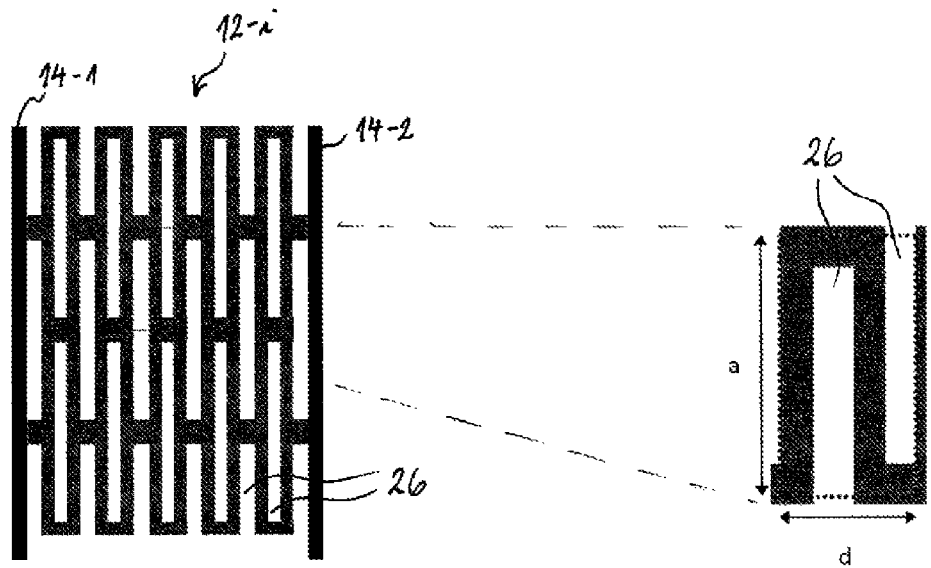
FIG. 6 a schematic plan view of a rectangular heating area according to a fourth procedure of printing pattern adaptation, as well as detail thereof.

A third procedure (Procedure III) is used for the further increasing of the sheet resistance through printing pattern adaptation. Here the heating area 12-$i$ is structured with diamond-shaped recesses 24, which are smaller but not very much smaller than the dimension of the heating area 12-$i$. Typically the lengths of the recesses should be in the range between one twentieth and one third of the lengths of the rectangular heating area. FIG. 5 shows the printing pattern geometry.

The heating area with the printing pattern adapted according to Procedure III is characterized by geometry factors $f_g$ and $f_w$ according to Eq. 8.

$$fg = \frac{d}{a}[?]; fw = \frac{w}{a} \quad \text{(Eq. 8)}$$

The width w of the printed bars is smaller than the lengths of the individual structure element, so that the scaling factor fs of the diamond pattern can be estimated to a good approximation using Eq. 9.

$$fs \approx [?] \frac{1}{2} \cdot \frac{\sqrt{1+fg^2}}{fw \cdot fg} \quad \text{(Eq. 9)}$$

With the restrictive condition that at least half of the heating area should be covered with ink, a possible adjustable range for the scaling factor $f_s$ emerges, typically of $2 < f_s < 25$.

In order to attain a scaling factor $f_s > 25$, a fourth procedure (Procedure IV) of the printing pattern adaptation is disclosed. In the rectangular heating area lengthwise recesses 26 are made periodically. The orientation of their longest side must be orthogonal to the direction of current flow, i.e. parallel to feed lines 14-1 and 14-2. The recesses are arranged in rows, and every second row is displaced a half-length in the longitudinal direction of the recesses. The recesses 26 should typically be more than three times longer than they are wide, i.e. a>3 d according to the terms used in FIG. 6. In the simplest case the recesses 26 are rectangular.

The geometric factors $f_g$ and $f_w$ of an individual structure element (see FIG. 6) are:

$$fg = \frac{d}{a}[?]; fw = \frac{w}{a} \quad \text{(Eq. 10)}$$

The scaling factor $f_s$ is estimated, taking into consideration the boundary conditions already mentioned, using Eq. 11.

$$fs \approx [?] \frac{fg - 2fw + 2}{fw} \quad \text{(Eq. 11)}$$

With the restrictive condition that at least half of the heating area should be covered with ink, a possible selectable range emerges for the scaling factor $f_s$, typically of $25 \leq f_s \leq 200$.

To summarize, the scaling factor $f_s$ which can be attained in printing pattern adaptation procedures I to IV is given in the following table:

| Printing pattern adaptation procedure | Scaling factor of the sheet resistance $f_s = Rsq_{eff}/Rsq$ |
|---|---|
| Print on the full area | 1 |
| Small recesses of any geometry (Procedure I) | $1 \leq f_s \leq 2$ |
| Recesses with strip geometry (Procedure II) | $1 \leq f_s \leq 2$ |
| Recesses with diamond pattern (Procedure III) | $2 \leq f_s \leq 25$ |
| Recesses with rectangle meandering (Procedure IV) | $25 \leq f_s \leq 200$ |

Construction of a Printed Heater

Embodiment of the Heater at the Level of the Print

In the following, embodiments of the heater print will be displayed on the basis of three rectangular heating elements. These embodiments can be transferred analogously to heaters with any N.

Figure 7:
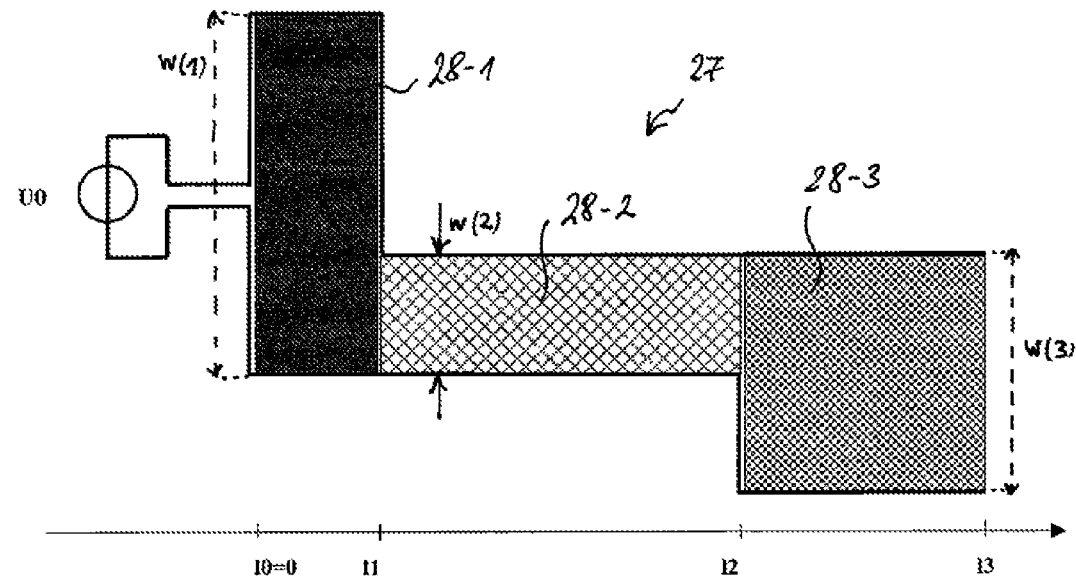
FIG. 7 a schematic plan view of a heater design which comprises three heating elements which are not arranged symmetrically around an axis.

FIG. 7 shows the printing of a heater 27 whose rectangular heating elements 28-1, 28-2, and 28-3 are not symmetrically arranged with respect to an axis. If the same choice is made for geometric and electric parameters, the surface power density as a function of the longitudinal coordinates of the heater is identical with that of the heater in FIG. 14 and corresponds to the surface power density shown in FIG. 15.

Figure 8:
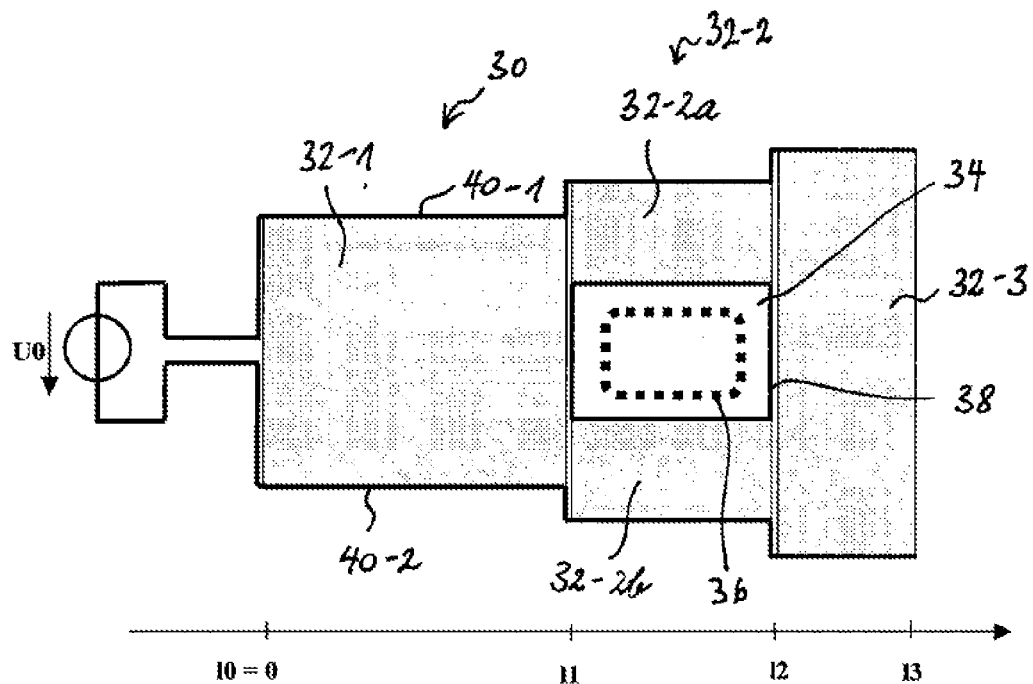
FIG. 8 a schematic plan view of the heater design of an interior lining element in which the heating elements enclose a recess.

FIG. 8 shows a heater 30 with heating elements 32-1, 32-2(=32-2a+32-2b), 32-3 which surround a centrally positioned recess 34, such as for instance an opening. This opening 36, which in FIG. 8 is positioned in the second rectangular heating element 32-2 and displayed with a thick broken line, has length s, such that s<l2−l1. The rectangular heating element 32-2 in the longitudinal range between l1 and l2 is divided into two, and each of the divided rectangular areas rectangular areas 32-2a, 32-2b has the width w2/2. The divided rectangular areas 32-2a and 32-2b on the side of opening 36 are connected via a connecting line 38 (in the example shown: via a conductor loop) with each other. Their resistance per unit length is R/l, as for the feed lines 40-1 and 40-2. The above-described printing pattern adaptation procedures can be used immediately for this form of heater.

Layered Construction of Different Interior Lining Elements

In the following, different embodiments are demonstrated of layered construction of the interior lining which is the subject of the invention. What all embodiments have in common is that the heater print does not represent a separate layer, but is directly printed on a component of the interior lining element which is present in any case and which fulfils a particular function even without heating. In particular, the heater print does not require an additional layer in construction such as for instance a film, a textile or a support material of any kind. For this reason, the component imprinted with the heater can continue to be processed, and for instance can be laminated on a support panel or molded to it by back-injection. Since the print is very thin in comparison to the thickness of all other components, the heater print is neither visible not haptically palpable on the decorative surface.

Heater Print on Top Layer

Figure 9:
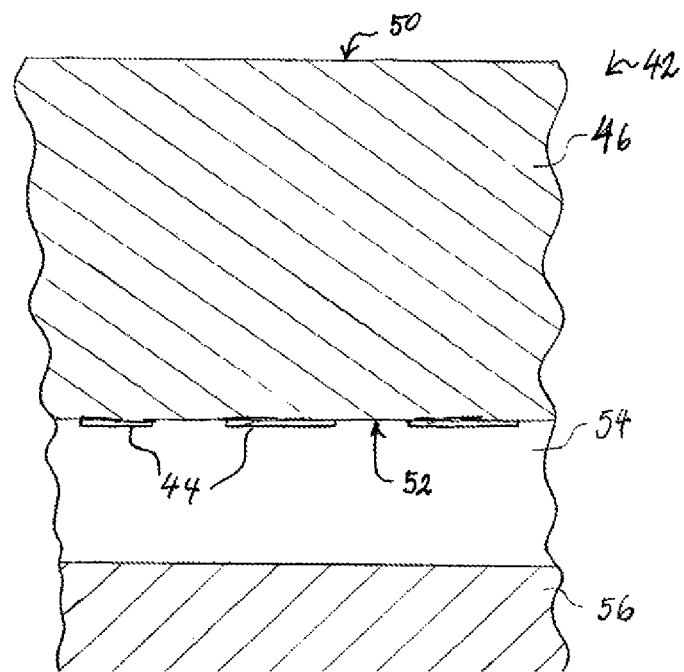
FIG. 9 a cross-sectional view of an interior lining element in which the heater print is directly printed on the decorative covering.

FIG. 9 shows the cross-section of an embodiment of the interior lining element 42 according to the invention in which the heater print is printed on the decorative layer 46. The outer side 50 of the decorative layer 46 can be seen and touched by the passenger. The interior 52 of the decorative layer is stuck using an adhesive 54 together with a support panel 56. It should be noted that the thickness of the adhesive 54, but particularly that of the decorative cover 46, is many times thicker than the imprint 44. The decorative layer 46 itself may be composed of different layers. The decorative layer 46 is material which can be seen and touched by the passenger, and which even without the heater print 44 would likewise be used and constructed on the panel 56.

Figure 10:
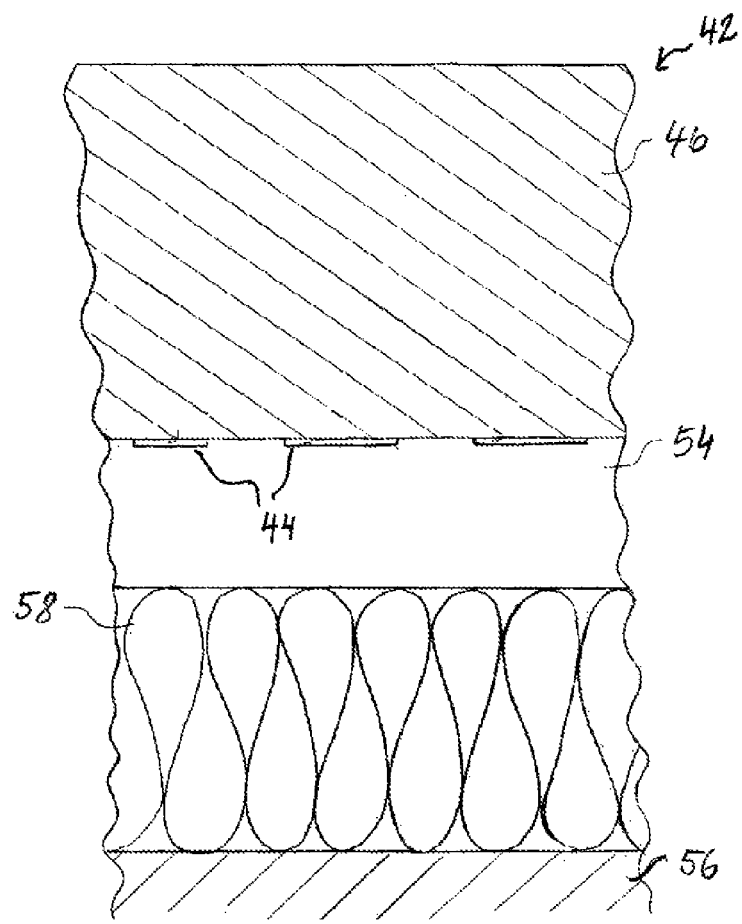
FIG. 10 a cross-sectional view of a further interior lining element in which the heater print is directly printed on the decorative covering.

FIG. 10 shows another construction of the layered stack in which the imprinted decorative layer 46 using the adhesive 54 is not directly laminated on the support panel 56 but on a cushioning layer 58. The cushioning 58 can in turn be composed of several different functional layers. The cushioning 58 is laminated on a support panel 56 or molded by back-injection to it, using an In-Mold procedure. It should be noted that the thickness of the adhesive, but particularly that of the decorative and the cushioning layers, is significantly thicker than the imprint 44. The cushioning layer has the purpose of improving the feel of the surface for the passengers. Moreover, the cushioning has the function of thermal insulation of the side which faces the support panel. The advantage of good thermal isolation of the cushioning is just as apparent as the advantage of a small thermal mass and high thermal conductivity of the decorative layer.

Figure 11:
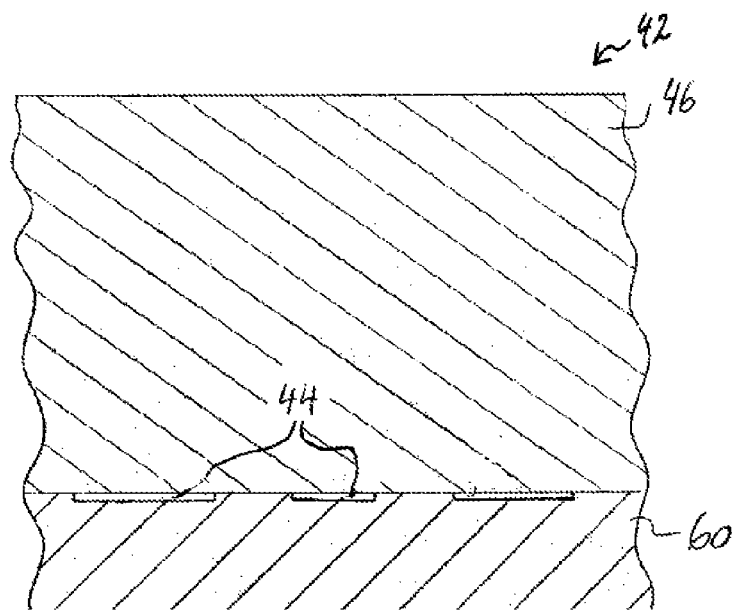
FIG. 11 a cross-sectional view of an interior lining element in which the heater print is directly printed on the decorative covering, the latter being molding by back-injection to the shaping support.

FIG. 11 shows the cross-section of a construction in which the decorative layer 46, with the heater imprint 44, has a back-injection carried out using an In-Mold procedure. The sprayed foam 60 joins seamlessly with the printed decorative layer 46. Once again, the thickness of the imprint 44 is many times smaller than that of the decorative layer 46 or the insert mold 60. The back-injection molding process functions with the heater print essentially in the same way as without the heater print.

Heater Print on Bottom Layer

Figure 12:
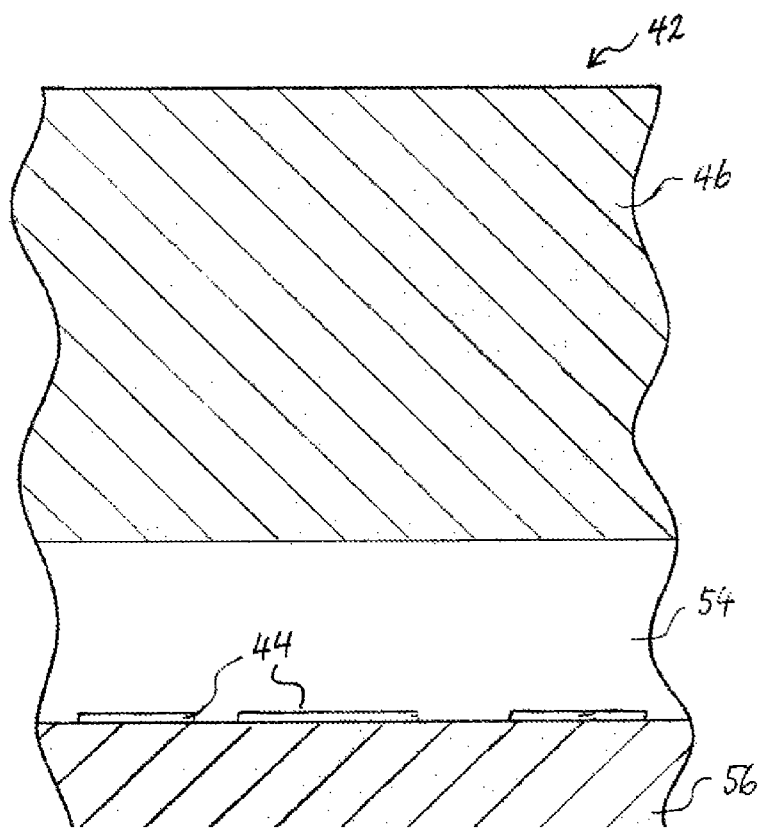
FIG. 12 a cross-sectional view of an interior lining element in which the heater print is directly printed on a support panel.

FIG. 12 shows the cross-section of a construction in which the heater print 44 is directly printed on a support panel 56. The decorative layer 46 is laminated on the printed panel 56 using an adhesive 54.

Figure 13:
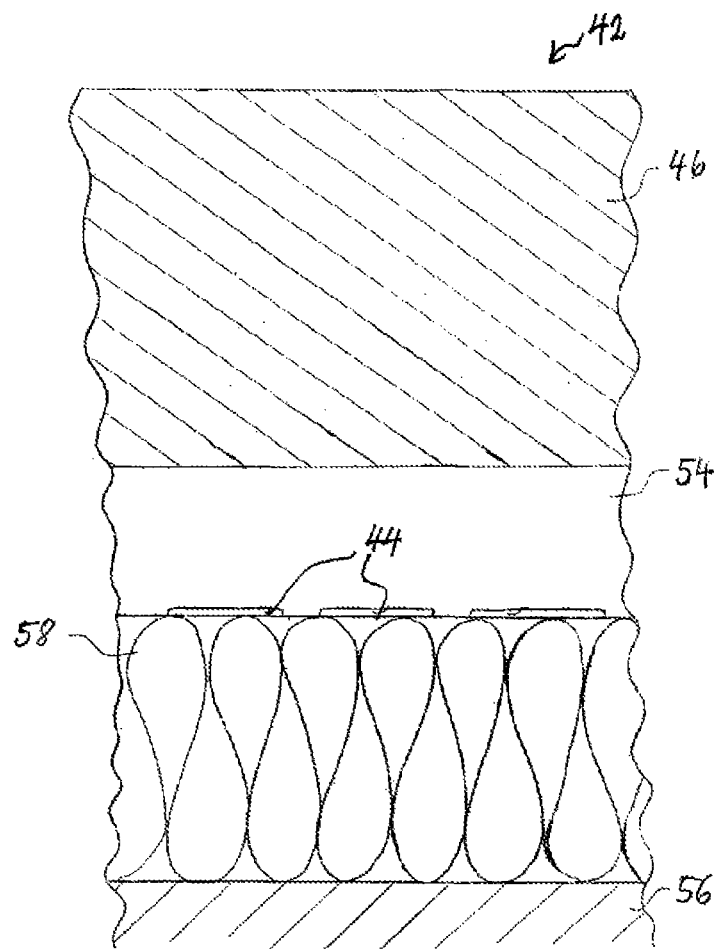
FIG. 13 cross-sectional view of an interior lining element in which the heater print is directly printed on a cushioning layer.

In FIG. 13 the cross-section of a form of embodiment is shown in which the heater print 44 is applied on a cushioning layer 58. The cushioning 58 may in turn be composed of several functional layers. The cushioning is laminated on a support panel 56 or molded to it by back-injection, using an In-Mold procedure. The decorative layer 46 is laminated on the printed cushioning layer using an adhesive 54. The manufacturing processes are essentially identical, whether with the heater print 44 or without it.

In another embodiment (not depicted in the figures) the decorative layer is not laminated on the printed bottom layer with an adhesive. Instead the decorative layer, without adhesive, is directly applied in a fluid state to the bottom layer which has the heater print, preferably a cushioning layer. Following this, using an embossing roller the decorative upper surface is brought into the optic design desired. A decorative layer created in this way is also many times thicker than the heater print. The spreading and embossing process are essentially unchanged compared with a bottom layer which has no heater print.

Materials and Processes

As described above, the heater may be printed directly on components of the interior lining element. The embedding of the component imprinted with the heater in for instance a door lining, a roof, a foot well or an instrument board then takes place via industrial manufacturing processes.

The heater print can be applied in particular on a) Decorative materials, i.e. those materials which can be seen and touched by passengers on the side which faces the inside of the passenger compartment; and b) Cushioning materials, i.e. those materials which are elastically easily deformable and which are essentially suited to influencing the haptics and the heat transport by the panel. Decorative and cushioning functions are not mutually exclusive.

Typical materials which are used as decorative materials are knitted or crocheted fabrics (due to their outstanding drapability), as well as spacer fabrics and films, artificial leather, and genuine leather. The decorative upper surface may be manufactured through direct laying of the synthetic decorative material on a drapable support and subsequent embossing. Generally the printing of the heater is carried out on the side of the decorative covering which faces the support panel. Here "decorative covering" can mean either a single layer with a decorative function or a combination of several single layers which are connected over some area (preferably essentially over their whole area), of which the outermost layer has decorative function. A decorative covering comprising a combination of several layers could for instance be a lamination of a knitted fabric with a very thin film (PET, PU, 12 to 50 micrometers) or with thin foams (PET, PU, open-cell or closed-cell, 0.5 to 5 mm) which are connected through a flame lamination process.

Typical materials used as cushioning are foams (PET, PU, open-cell or closed-cell, 0.5 to 8 mm) or spacer fabrics (PET, 0.5 to 10 mm). Sufficient drapability is also advantageous in cushioning. Generally the heater print is printed on the side of the cushioning which faces away from the support panel. The cushioning may also comprise a combination of layers. Hence the cushioning may be laminated on the back side (the side facing the support panel) and/or the upper side (the side facing away from the support panel) with a very thin film (PET, PU, 12 to 50 micrometers). On the back side lamination may be advantageous if the cushion is to be molded by back-injection, and on the front side lamination makes sense in order to minimize the heat transfer between the support panel and the decorative layer through convection.

Before the heater printing, the printing substrate is thermally stabilized, so that during the drying of the ink no large changes in dimensions can appear. As at least two consecutive printing and drying steps are necessary, the dimensional accuracy of the printing substrate after the first printing and drying step is of particular importance. The requirement on the registration of consecutive printing steps is already particularly low through the arrangement of the heater. However, a linear contraction of the printing substrate in the drying steps of no more than 1.5% is recommended, in particular with boards with large dimensions.

The heater is manufactured in at least two printing steps:
1) One print with an electrically highly conductive ink, with which the feed lines with a low resistance per unit length, R/l, can be realized.
2) One print with an electrically less conductive ink, with which the resistance areas can be realized. Different sheet resistances Rsq(i) are realized using printing pattern adaptation. It is advantageous to first print the feed lines and then dry them, and then to print the resistance areas and dry them. When the ink with worse electrical conductivity is printed, through overlapping pressure with the previously applied electrically highly conductive ink, contact-making regions are created.
3) Optionally, as a third printing step, an electrically insulating protective layer can be applied, with the purpose a.) of increasing the durability of the conductive printing against humidity and b.) of increasing the adhesion of the printing to the adhesive or the back-injection foam. Instead of the $3^{rd}$ printing step, a flat moisture protection could be provided.

Silver-based inks are preferably to be considered as highly conductive inks for the feed lines. Polymer thick film prints are possible using an ink which is a composition of silver flakes in the micrometer area of size, a binding agent and a solvent, as well as further additives. Another possibility is inks made of silver nanoparticles which require no further binding agent and which sinter during the drying step in order to realize higher specific conductivities in this way. Another possibility is inks made of copper or copper oxide nanoparticles which are chemically reduced in the drying process and also sinter.

As a resistor ink (for the resistance elements) polymer thick film prints are preferable which as electrically conductive component contain graphene, CNTs, Carbon Black, graphite or mixtures thereof. What is particularly useful is the use of a print the resistance of which rises with rising temperature (PTC resistance) in order to throttle the heating power when the temperature rises.

In order to print a protective layer for the heater, PU-based ink is to be considered in particular.

The printing processes are preferably screen printing processes (flatbed or rotary printing). Other printing processes such as relief printing, gravure or inkjet printing are also possible. In order to dry or sinter the inks, convection ovens with temperatures up to approx. 150° C. are used, but also infrared dryers, UV dryers and flash lamps which mainly work in the visible area of the electromagnetic spectrum.

For the lamination of the printed decorative covering thermally activated two-component adhesives are preferably used. Other adhesives (reactive or non-reactive) are possible. During lamination a three-dimensional support panel is laid into the heated bottom part of a pressing device, the decorative material is laid over the support panel and it is subsequently laminated using the upper part of the press, crease-free and with moderate pressure, onto the support. Areas of strong stretching of the decorative covering or the cushioning, or openings therein can unproblematically be omitted from the printing (and hence from the heater).

For back-injection in an In-Mold procedure, the printed decorative covering or the printed cushioning is laid on the injection mold. Following this, the back side of the injection mold is closed. In the injection molding process the decorative covering or the cushioning is then molded with back-injection and pressed crease-free onto the front side of the shape. After the cooling and solidifying of the injection-molded part, the decorative covering or cushioning retains its shape.

For electric contact-making, the decorative layer or the cushioning layer including the printed feed lines, in the area of the feed lines, are laid over the edge of the panel on the back side of the panel and are stuck in place. The radius of the table edge should not be made too small, so that the extension stress of the feed can be kept low. A curvature radius smaller than 1 mm is entirely acceptable here.

The electric contact-making is preferably realized with a crimping technique in which one or more crimps which are connected with each other and have the possibility of a crimp connection and/or solder connection, penetrate the printed feed lines. In the positioning of the crimps in parallel care should be taken to ensure that the current is uniform over the whole width of the respective circuit track. Multistrand cables, the cross-section of which is adapted to the maximal current, preferably with silicon or PP insulation, are crimped/soldered with both crimp connections of the circuit. As a strain relief a hot glue is preferably used, with which the two previously manufactured connecting cables can be stuck to the back side of the panel. For the hot glue a thermally activated two-component system is used. The manufactured cables preferably have a standard plug which defines the electrical power interface with the on-board electricity. The entire contact-making region on the back side of the support can be covered with a double-sided adhesive film, on which a non-woven material, such as a fleece, or another protective layer is applied for cover. The contact is therefore not visible from the front side of the interior lining element. The installation depth of the contact on the back side of the support may be less than three millimeters.

The materials used (decorative layer, cushioning, inks, crimp connectors, solder, adhesive, hot glues) are preferably to be chosen in such a manner that the desired lifetime (e.g. 15 years in a car) is ensured.

Illustration Using a Concrete Example

In the following reference is made to FIGS. 14 to 17, in order to describe in detail an interior lining element 100 according to the invention.

Figure 14:
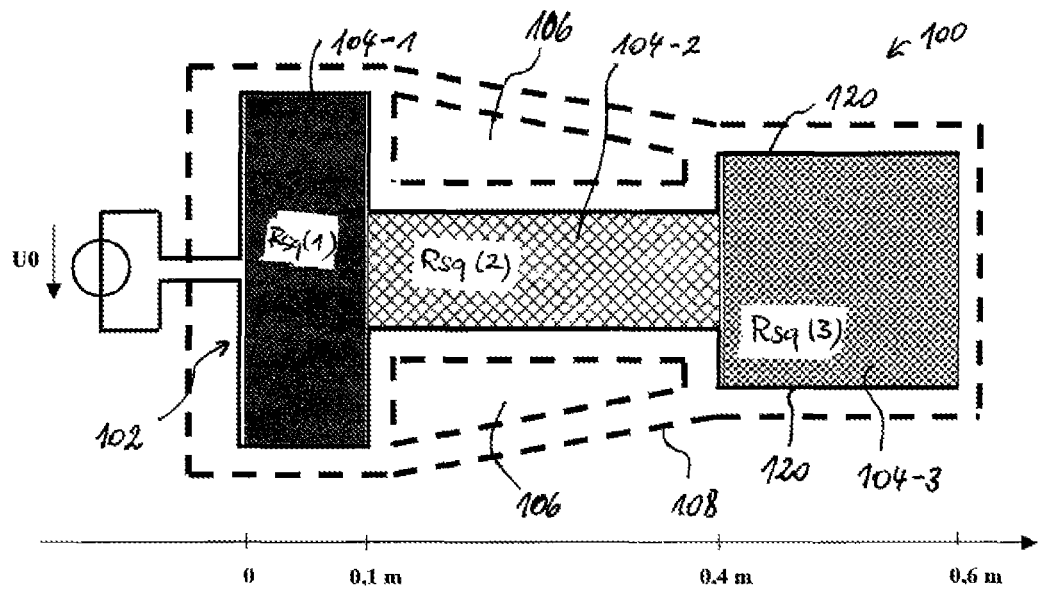
FIG. 14 a schematic plan view of a heater design of an interior lining element with three rectangular heating areas.

The printed heater 102 of the interior lining element 100 has three rectangular heating areas 104-1, 104-2, and 104-3, which are arranged in the order shown in FIG. 14. The middle rectangular heating area 104-2 is considerably narrower than those in front of and behind it, 104-1 and 104-3. The reason for this formation may be openings or strongly spatially curved areas in the areas marked with the reference number 106 in the interior lining element 100. Similarly, what is shown in FIG. 14 is the outline of the support panel 108 on which the decorative material printed with the heater 102 is installed. It becomes clear how the external form of the heater 102 is adapted to the specified form and topography of the panel 108.

Under the assumption that the geometric measurements are as specified in FIG. 14, and that the on-board voltage is 13.5 V, the resistance per unit length of the supply lines R/l=1 Ohm/m and the target value of the surface power density is 200 W/m$^2$, the question arises how the three sheet resistances Rsq(1), Rsq(2) and Rsq(3) must be selected in order to attain an optimal homogeneous surface power density of 200 W/m$^2$. For this first the voltages dropping over the heating elements are expressed as a function of the known quantities a.) line resistance per unit length rp, b.) the geometry with parameters l(i) and w(i), c.) the on-board voltage U0 and d.) the unknown sheet resistances Rsq(i) or gp(i). Then the voltage values are inserted in the target function (Eq. 4) with N=3. Numerical minimization of the target function in this example provides the sheet resistances Rsq(1)=10 Ohm, Rsq(2)=85 Ohm and Rsq(3)=20 Ohm.

Figure 15:
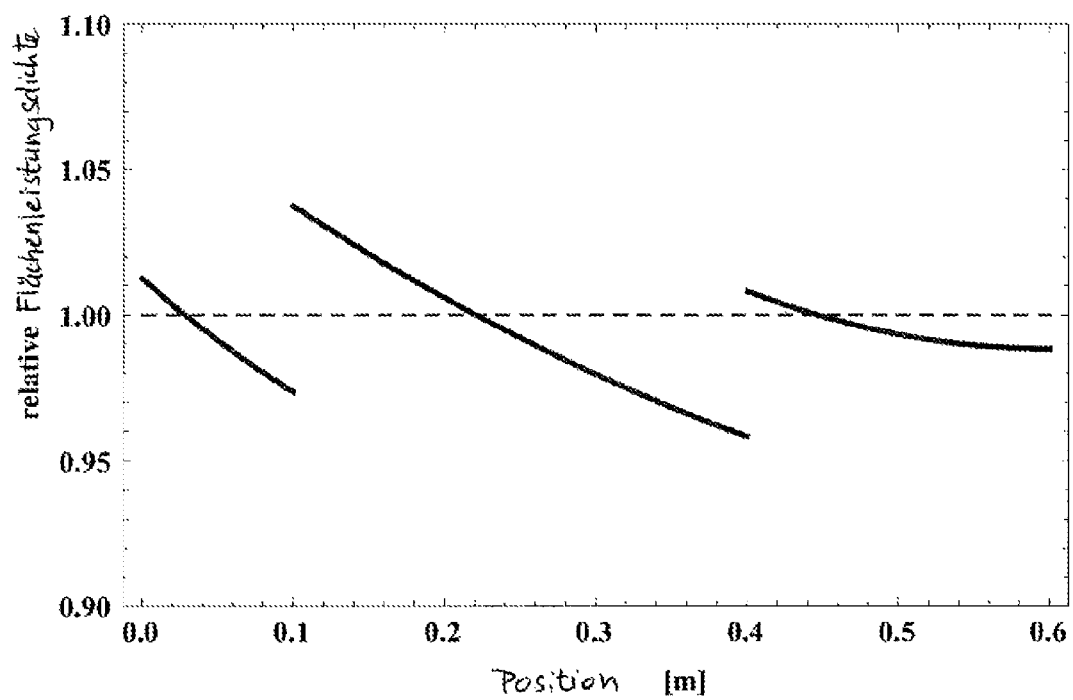
FIG. 15 a graphic depiction of the surface power density of the heater design from FIG. 14 as a function of the longitude coordinates.

FIG. 15 shows the power distribution attained in this way as a function of the location along the longitudinal axis of the heater. The power distribution is displayed on the Y-axis as a ratio to the target value of the surface power density (200 W/m$^2$). The surface power density of the heater across the whole heater area is in a close range of ±5% around the target value. What is clearly visible in FIG. 15 is the non-linear path of the power density as well as the regions of discontinuity between the rectangular heating areas.

The different sheet resistances are realized through printing pattern adaptation, with the point of departure being a sheet resistance which corresponds to printing on the full area. First the low sheet resistance is set through an appropriate selection of the resistor ink and printing thickness, such that Rsq(1)=10 Ohm. Based on Rsq(1), both of the sheet resistances Rsq(2) and Rsq(3) will now be realized through printing pattern adaptation. In the case of Rsq(2) the sheet resistance is higher than Rsq(1) by a factor of 8.5, and in the case of Rsq(3) by a factor of 2.0. Accordingly Rsq(2) can be realized with a diamond pattern with the geometrical parameters a=2.0 cm, d=1.0 cm and w=0.26 cm according to Eq. 8 and 9 (Procedure III of printing pattern adaptation). These parameters correspond to a fifteenth of the width and a tenth of the length of rectangular heating area 104-2. Rectangular heating area 104-2 is therefore structured with 150 diamond elements (diamond-shaped recesses). Rsq(3), on the other hand, can be realized using a pattern of randomly shaped and positioned small recesses in printing, so that the degree of filling of the surface is 0.5 (Procedure I of printing pattern adaptation). The different prints for the realization of sheet resistances Rsq(2) and Rsq(3) are only schematically indicated in FIG. 14.

Figure 16:
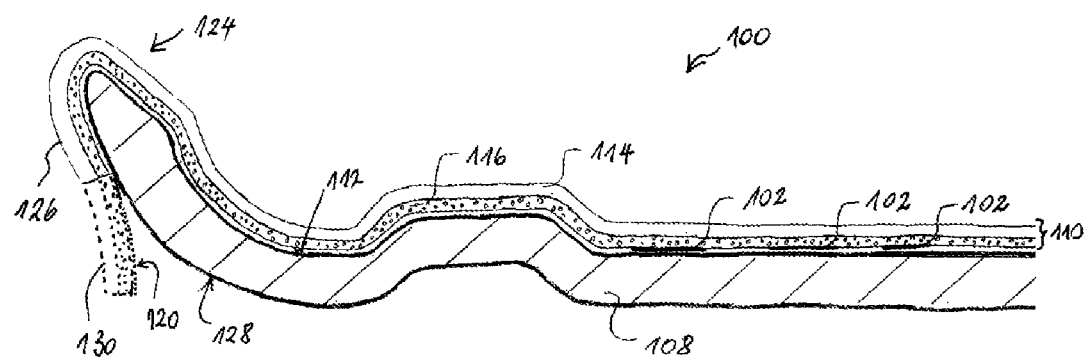
FIG. 16 a schematic cross-section of a part of the interior lining element of FIG. 14.

A part of the cross-section through the interior lining element 100 is displayed in FIG. 16. What is clearly recognizable is the three-dimensional shape of the support panel 108 and the fact that this shape is taken on by the decorative covering 110. The heater print 102 is printed in particular areas of the interior lining element 100. The print is on the back side of the decorative covering 110, which is designed as a composition of layers. The decorative covering 110 and the other components of the interior lining element 100 could also be processed without the heater print with essentially the same manufacturing parameters, because the heater print is flexible and is much thinner than all other components of the interior compartment lining. No additional space (e.g. in the form of an recess or a depression in a component) is necessary to accommodate the heater. The heater is not visible from the passenger compartment, nor can its topography be felt. Due to the heater's proximity to the decorative surface and the low thermal mass of the decorative material, the operating temperature (of e.g. approx. 40° C.) at the decorative surface can be attained within a short period of time and with minimal energy consumption. The surface power density, based on the invention's construction of the heater print, is at a maximum in all panel areas which can/should be heated.

Figure 17:
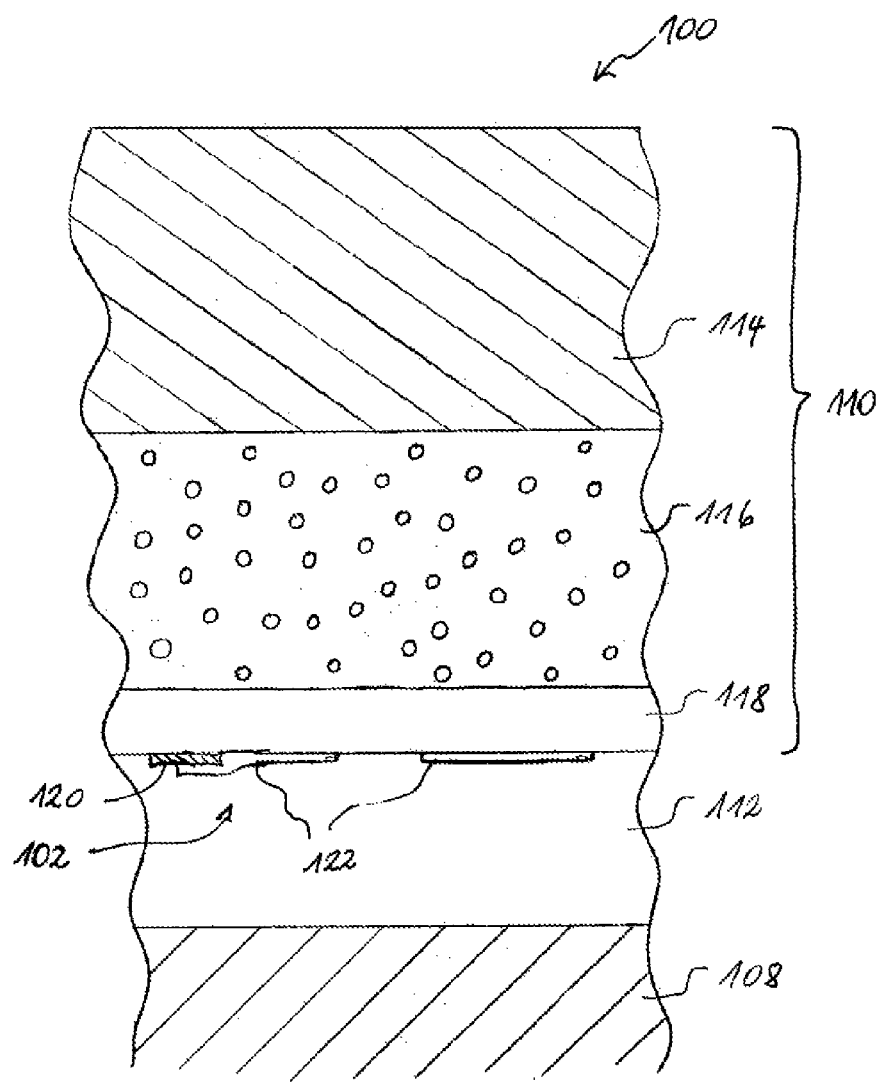
FIG. 17 an expanded detail of the schematic cross-section of FIG. 16.

In order to better visualize the structure of this interior lining element 100, FIG. 17 shows a schematic cross-section on a smaller scale. It becomes clear that the thickness of the heater print 102 (with a size typically of the order of 10 micrometers) is negligibly thin compared with the decorative covering 110 and the panel 108, and is even thin compared with the adhesive 112. The decorative covering 110 surrounds an elastically approximately isotropic knitted PET fabric 114 with a mass per unit area of 200 g/m$^2$, which is flame-laminated with an open-cell PET foam 116 of approx. 0.8 mm thickness and a PU film 118 of 0.025 mm thickness. The heater 102 has been printed in screen printing processes on the back side of the decorative covering 110 facing the support panel 108.

During printing, after temperature stabilization of the printing substrate for three minutes at 150° C., first of all the highly conductive silver print for the feed lines 120 is applied. The printing width and thickness are set such that a resistance per unit length of 1 Ohm/m is attained. After drying at 150° C. for 90 s the resistance print 122 is subsequently applied in a single printing step. The printing pattern adaptation with the investigated parameters described above is used. The resistance ink then dries for 90 s at 150° C. In this example no additional, electrically non-conductive protective layer has been printed.

The imprinted decorative covering 110 is connected with the support panel 108 in a lamination process. The imprinted side of the decorative covering 110 is oriented towards the 108. For this a two-component adhesive (adhesive 112) is sprayed on support panel 108 and decorative covering 110. After a drying phase the support panel 108 and the decorative covering 110 are inserted into a hot press the upper surface of which is adapted to the shape of the panel. In the sticking procedure the adhesive is thermally activated at approx. 125° C. The pressure at which the decorative covering 110 is stuck crease-free on the three-dimensional support panel 108 is approx. 1 bar, and the holding time is approx. 30 s. In doing this the decorative covering 110 is guided around the edge 124 of the panel 108, and the overhang 126 of the decorative cover is set for example at approx. 1 cm. This is fixed to the back side 128 of the support panel 108 in a further adhesion step.

In the area of the feed lines the overhang 126 is selected larger (e.g. approx. 5 cm), so that a prolongation 130 (indicated with a broken line) is formed. This is not completely stuck to the support panel 108, in order to make electrical contact of the printed feed lines 120 possible. The contact is made via several crimp straps in the area of the printed circuit paths. Manufactured cables were previously crimped/soldered on the crimps. For mechanical relief of strain, the cables are preferably fastened with hot glue on the back side of the support panel. Finally, with the help of a double-sided adhesive band a fleece material is stuck on the entire area of the contact. The contact is no thicker than 3 mm, and hence can be integrated without any problems in the holder for the interior lining element provided in the car door or the car body. Of course the electrical contact is neither visible nor palpable by passengers.

The feed lines printed with the highly conductive ink are preferably designed in the area of the edge of the support panel in such a way that through enveloping around the edge of the panel, the feed line resistance in this area is smaller than R/l. In this edge area the feed lines are guided around the small radius of the support panel. A wider or a thicker print can be used in order to reduce the resistance WI in this area only. Such a reduction of R/l is irrelevant for the dimensioning of the heater. Through widened or thickened print, any local increase in resistance is counteracted which may be caused by the enveloping around the support panel.

An interior lining element may of course also have several heating circuits of the said type which are supplied electrically via more than one contact. In this case the feed lines to these contacts are guided in different places around the support edge to the back side of the support panel.

Even though specific embodiments have been described in deal, for the man of the art it is understood that different modifications of and alternatives to these details may be developed in view of the entire teach, in view of the overall teaching of the disclosure. Accordingly the particular arrangements disclosed are to serve solely as an illustration, and do not restrict the protected area of the invention, which covers the full breadth of the claims attached and any equivalents thereof.

The invention claimed is:

1. An interior lining element for a passenger compartment of a vehicle, comprising:
    a single-layer or multilayer decorative cover, a front side of which faces a passenger compartment and delimits the passenger compartment physically and, wherein a back side of the single-layer or multilayer decorative cover is in thermally conductive contact with a printed heater,
    wherein the printed heater is printed using a resistive ink and has a plurality of single-layer flat resistance elements that form rectangular areas and at least two feed lines which are electrically highly conductive as compared with the plurality of single-layer flat resistance elements and via which the plurality of single-layer flat resistance elements can be looped into an electric circuit,
    wherein at least two of the plurality of single-layer flat resistance elements are of different sizes or of different proportions and have different mean sheet resistances enabling a substantially homogeneous temperature distribution over the lining element, wherein the different mean sheet resistances are achieved using different printing patterns,
    wherein at least a portion of the plurality of single-layer flat resistance elements are arranged and wired between two connection points of the printed heater in such a way:
        that the at least two of the plurality of single-layer flat resistance elements having different mean sheet resistances are wired one behind the other via the at least two feed lines starting from the two connection points, and
        that mean sheet resistances of the at least two of the plurality of single-layer flat resistance elements having different mean sheet resistances decrease starting from the two connection points of the printed heater.

2. The interior lining element according to claim 1, wherein in contact-making regions of the plurality of single-layer flat resistance elements and the at least two feed lines, respectively, one feed line and one single-layer flat resistance element are printed overlapping each other.

3. The interior lining element according to claim 1, wherein the plurality of single-layer flat resistance elements are arranged electrically in parallel to each other, individually or in groups, via the at least two feed lines.

4. The interior lining element according to claim 1, comprising contact-making regions that extend along opposite sides of the rectangular areas.

5. The interior lining element according to claim 4, wherein at least two of the rectangular areas form different resistances between the respective contact-making regions.

6. The interior lining element according to claim 4, wherein heating power per unit area of each of the rectangular areas is in a range between 85% and 115% of a mean heating power per unit area of all the rectangular areas.

7. The interior lining element according to claim 4, wherein heating power per unit area averaged over an area bordered by a boundary line formed by outer edges of the rectangular areas and straight lines which connect the outer edges, or heating power per unit area averaged over the area, minus an area of any openings in the interior lining element which are enclosed by the boundary line, is not less than 65% of an average heating power per unit area of all rectangular areas.

8. The interior lining element according to claim 4, wherein at least two of the plurality of single-layer flat resistance elements are arranged electrically in series via a connecting line which is electrically highly conductive compared to the plurality of single-layer flat resistance elements.

9. The interior lining element according to claim 8, wherein the at least two of the plurality of single-layer flat resistance elements electrically arranged in series are electrically arranged in parallel via the at least two feed lines with either at least one other single-layer flat resistance element or at least two further single-layer flat resistance elements which are electrically arranged in series.

10. The interior lining element according to claim 1, wherein the plurality of single-layer flat resistance elements are made of a same printing material.

11. The interior lining element according to claim 10, wherein the printing material has a same thickness for all of the plurality of single-layer flat resistance elements.

12. The interior lining element according to claim 1, comprising a shaping support, including a support board or a molded component, onto which the single-layer or multilayer decorative covering is laminated, with or without an intermediate cushioning layer, respectively which is molded by back-injection to the single-layer or multilayer decorative covering, with or without the intermediate cushioning layer.

13. The interior lining element according to claim 12, wherein the shaping support has a spatial curvature, wherein the single-layer or multilayer decorative covering, taking on the spatial curvature, is fixed on the support, and wherein the plurality of single-layer resistance elements are printed as areas of the single-layer or multilayer decorative covering with recess curvature radii of less than 1 cm.

14. The interior lining element according to claim 12, wherein relative to the shaping support the single-layer or multilayer decorative covering has a lateral overhang which envelopes one edge of the shaping support.

15. The interior lining element according to claim 14, wherein the lateral overhang enveloping the edge of the shaping support is stuck to the shaping support.

16. The interior lining element according to claim 14, wherein the at least two feed lines extend to the lateral overhang and form electrical connections there.

17. The interior lining element according to claim 16 wherein the one edge of the shaping support, at least where the at least two feed lines extend to the lateral overhang, has a radius of curvature of not less than 0.5 mm.

18. The interior lining element according to claim 16 wherein the lateral overhang has a prolongation to which the at least two feed lines extend and there form the electrical connections, and in which the prolongation is not stuck to the shaping support, so that access to the electrical connections is possible.

19. The interior lining element according to claim 16, wherein the at least two feed lines, in an area in which the at least two extend to the lateral overhang, are printed thicker and/or wider compared to other areas.

20. The interior lining element according to claim 19, wherein the shaping support includes the support board or the molded component, with an edge around which the at least two feed lines are guided in at least two different positions for contact-making.

21. The interior lining element according to claim 1, wherein the printed heater has at least three feed lines via which the plurality of single-layer flat resistance elements, individually or in groups, can be looped in to a power supply in different electric circuits.

22. The interior lining element according to claim 1, wherein the printed heater is printed directly on a back side of the decorative covering.

23. The interior lining element according to claim 1, wherein the printed heater is printed directly on a cushioning layer which is fastened to a back side of the single-layer or multilayer decorative covering.

24. The interior lining element according to claim 1, wherein at least one of the plurality of single-layer flat resistance element comprises a polymer thick film print, a resistance of which rises as a function of temperature.

* * * * *